Figure 1:
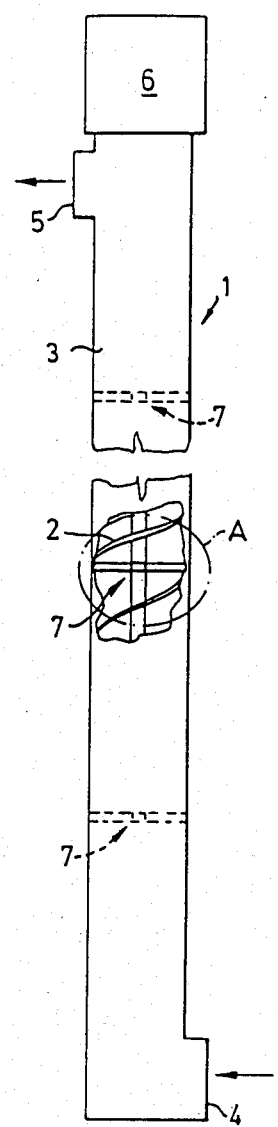

United States Patent [19]

George

[11] Patent Number: 4,645,067
[45] Date of Patent: Feb. 24, 1987

[54] SCREW CONVEYOR

[75] Inventor: Bengt-Göran George, Enkoping, Sweden

[73] Assignee: AB Nordstroms Linbanor, Enkoping, Sweden

[21] Appl. No.: 828,260

[22] Filed: Feb. 11, 1986

[30] Foreign Application Priority Data

Feb. 15, 1985 [SE] Sweden .............................. 8500729

[51] Int. Cl.$^4$ ............................................ B65Q 33/32
[52] U.S. Cl. ..................................... 198/666; 198/672
[58] Field of Search ............... 198/666, 672, 659, 667; 403/26, 288, 292, 298; 277/81 R, 85, 87, 88, 212 FB

[56] References Cited

U.S. PATENT DOCUMENTS 4,077,508  3/1978  Pederson .............................. 198/666

FOREIGN PATENT DOCUMENTS 468608   7/1972  Australia ............................. 198/666
61996    5/1968  German Democratic Rep. ................................. 198/666
50865    4/1966  Poland ................................. 198/666
431965   3/1984  Sweden .

Primary Examiner—Joseph E. Valenza
Assistant Examiner—Jonathan D. Holmes
Attorney, Agent, or Firm—Young & Thompson

[57] ABSTRACT

In a screw conveyor the conveyor screw is arranged in a casing where there is at least one support fastened to the casing between the ends of the conveyor screw, the conveyor screw being mounted in the support via a bearing which is sealed by a seal. Included in the seal there are two sealing devices which are unrotatably but axially displaceably mounted on the screw shaft, and which are urged axially from opposite directions to press with a respective sealing portion against a corresponding sealing portion on the support. The sealing portions are situated radially outside the bearing. Each sealing device at its end facing away from the support engages against a sealing element, which in turn connects to the screw shaft.

8 Claims, 2 Drawing Figures

SCREW CONVEYOR

The present invention relates to a screw conveyor, where a conveyor screw is arranged in a casing and where there is at least one support means fastened to the casing between the ends of the conveyor screw, for mounting the conveyor screw via a bearing sealed by a sealing means, the conveyor screw shaft having a reduced diameter at the support means.

In screw conveyors of this type it is usual for the support means to be axially stationary relative the casing. However, friction between the screw and the conveyed material causes length increase in the screw, and it is therefore desirable for the screw shaft to be axially movable relative the support means. It is essential here that the conveyed goods is not allowed to disturb the function of the conveyor as a result of the axial movement of the screw, e.g. by penetrating into the bearing mounted on the support means or by making the axial movement of the screw relative the support means more difficult.

The British Patent Specification No. 2 071 597 teaches a screw conveyor of the kind mentioned in the introduction, where a shaft stub journalled in a bearing on a support means is united in a way such that there are rather large free spaces between the conveyor screw parts and the support means, which allows comparatively large axial play. In unfavourable circumstances these free spaces can be plugged up so that axial movement is made more difficult or impossible.

In another known embodiment, e.g. according to the German Offenlegungsschrift No. 1 968 556, the connection is considerably better between the screw conveyor shaft and the support means, but on the other hand axial movement of the conveyor screw is made more difficult. Furthermore, the conveyed material can easily penetrate into the sleeve included in the support means.

The object of the invention is therefore to provide an improved screw conveyor where the conveyor screw has freedom of axial movement, while at the same time the conveyed material is prevented from interfering with the function of the screw conveyor.

This is achieved in accordance with the invention in that there are included in the sealing means two sealing devices mounted non-rotatably but axially displaceably on the shaft of the conveyor screw, the sealing devices each arranged to press axially, from opposite directions with a sealing portion sealingly against a corresponding sealing portion on the support means, the sealing portions being situated radially outside the bearing and preferably having a diameter substantially equal to the normal diameter of the shaft, each sealing device, at its end facing away from the support means being in contact with a sealing element, which in turn at its end facing away from the support means connects to the shaft and has an outside diameter substantially equal to the normal diameter of the shaft. There is thus obtained good sealing between the conveyor screw and the support means, even when the screw moves axially relative the support means. Material flow through the conveyor screw is further facilitated by the sealing portion having an outside diameter which is substantially equal to the normal diameter of the shaft. Simple compensation of wear of the sealing portions is further enabled by the sealing devices being axially movable. To increase the life of the sealing portions, they are advantageously made from tungsten carbide or the like.

According to a particularly advantageous embodiment, portions of both sealing devices form together the shaft journal in the bearing, and inside the bearing there is an annular seal between them. There is thus ensured in a simple manner that lubrication agent in the bearing is kept in place and cannot penetrate out to the surroundings. Further distinguishing features and advantages of the invention will be apparent from the description and claims.

Figure 2:
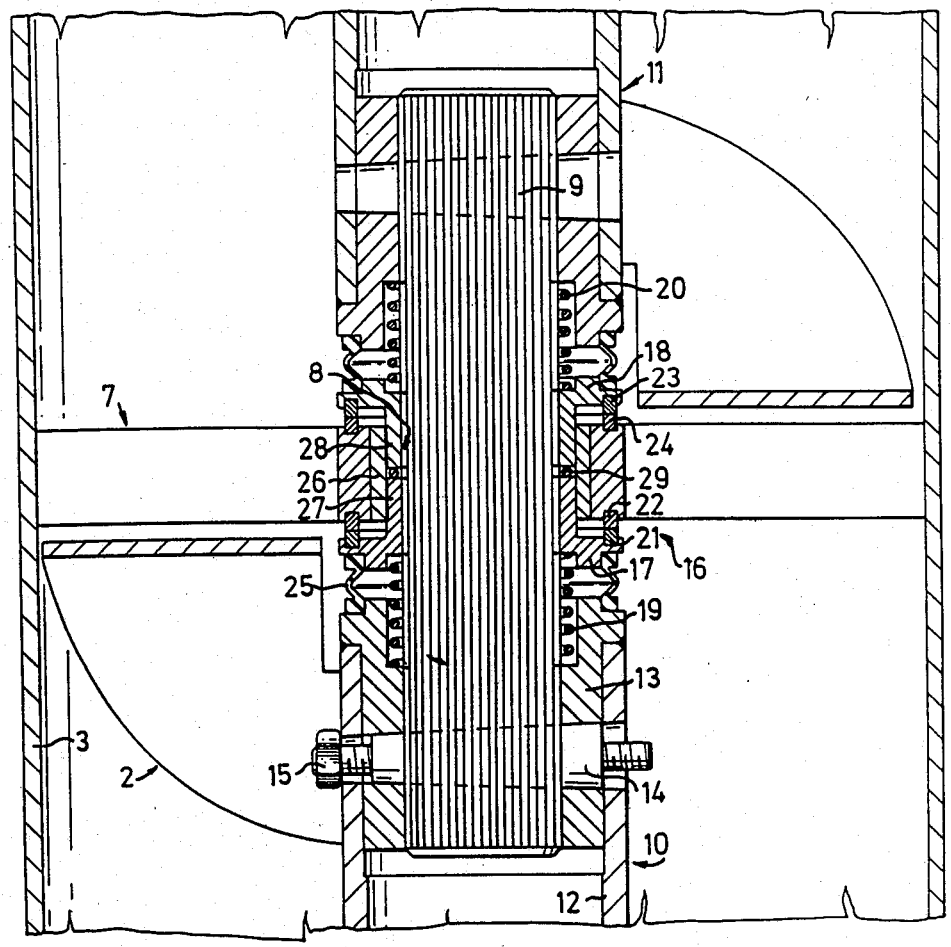

The invention will now be described in detail with the aid of an embodiment illustrated on the accompanying drawing, where FIG. 1 schematically illustrates a vertically arranged screw conveyor in accordance with the invention, and FIG. 2 is an axial section through the portion A in FIG. 1, to an enlarged scale.

In an inventive screw conveyor 1, there is a rotatable conveyor screw 2 mounted in a casing 3 for conveying material in the longitudinal direction of the screw from an inlet 4 to an outlet 5. There is a drive means 6 for driving the conveyor screw 2. The length of the conveyor screw 2 can often attain some tens of metres, e.g. in equipment for unloading vessels, where the screw is usually substantially vertically oriented. Between both ends of the conveyor screw there is a plurality of support means 7, which maintain the conveyor screw in a radial direction relative the casing 3 but which permit passage of the conveyed material. The number of support means 7 required is dependent on the dimensions of the conveyor screw, above all on its length. For large screw lengths the screw is usually subdivided into many screw sections, often with a length of about 3 m. A natural place for the support means is then at the joint between two screw sections, thus at an axial interruption in the helical surface of the screw.

The arrangement at a support means 7 is more closely illustrated in FIG. 2. An intermediate shaft 9 is mounted in the support means 7 via a bearing 8 and keeps two conveyor screw sections 10 and 11 together. The shaft 12 in the conveyor screw section 10 is tubular and has a bush 13 welded onto its end, this bush being provided with internal splines for unrotatable engagement with the intermediate shaft 9. A locking pin 14, which advantageously is tapered, maintains the intermediate shaft 9 axially in the bush 13 and is kept locked with the aid of a nut 15. By moving over the nut 15 to the other end of the locking pin 14 there is enabled simple removal of the pin, as is illustrated of the upper end of the intermediate shaft 9, so that the parts can be dismantled.

The bearing 8 is sealed with the aid of a sealing means 16, including two sealing devices 17 and 18 unrotatably but axially displaceably mounted on the intermediate shaft 9. These are arranged so that with the aid of respective helical compression springs 19 and 20 they are urged from opposite directions towards the support means 7 so that sealing contact occurs between a sealing portion 21 on the sealing device 17 and a corresponding sealing portion 22 on the support means 7, and so that corresponding sealing contact occurs between a sealing portion 23 on the sealing device 18 and a sealing portion 24 on the support means 7. The sealing portions 21–24 have substantially the same outside diameter as the shaft 12 and are situated radially outside the bearing 8. These sealing portions are advantageously made as tungsten carbide rings, but can naturally be made in some other way. Between the sealing device 17 and bush 13 there is an axially elastic sealing element 25, the diameter of which substantially corresponds to the diameter of the sealing portions 21–24. There is thus obtained a comparatively smooth exterior for the conveyor screw shaft, with the object of facilitating the flow of conveyed material, simultaneously as conveyed material is prevented from penetrating into parts which may need to move in relation to each other.

There is a corresponding sealing element arranged in connection with the sealing device 18.

In the illustrated embodiment, the bearing 8 is made together with the support means 7 as a sliding bearing with bush 26 united with the support means 7. Sleeve-like portions 27 and 28 on the respective sealing devices 17 and 18 together form the shaft journal of the bearing 8. Between both sleeve-like portions 27 and 28 there is an annular seal 29 preventing lubricant from leaking out from the bearing. There may possibly be ducts for the supply of lubricant to the bearing 8 arranged in the support means 7.

It is also possible to allow the shaft journal to be made from a single, extended sleeve-like portion 27 or 28. According to a further solution, the shaft journal may comprise a separate ring mounted on the intermediate shaft.

I claim:

1. A screw conveyor where a conveyor screw is arranged in a casing, and where there is at least one support means fastened to the casing between the ends of the conveyor screw, for mounting the conveyor screw via a bearing sealed by a sealing means, the conveyor screw shaft having a reduced diameter at the support means, characterized in that the sealing means includes two sealing devices mounted nonrotatably, but axially displaceable on the shaft of the conveyor screw, the sealing devices each being arranged to press axially, from opposite directions, with a sealing portion sealingly against a corresponding sealing portion, respectively, on the support means, in that the sealing portions are situated radially outside the bearing and preferably have a diameter substantially equal to the normal diameter of the shaft, and in that each sealing device, at its end facing away from the support means, is in contact with a sealing element, which in turn at its end facing away from the support means connects to the shaft, and has an outside diameter substantially equal to the normal diameter of the shaft.

2. Screw conveyor as claimed in claim 1, characterized in that a portion of at least one sealing device forms a shaft journal in the bearing.

3. Screw conveyor as claimed in claim 2, characterized in that portions on both sealing devices together form a shaft journal in the bearing.

4. Screw conveyor as claimed in claim 3, characterized in that the sealing portions are made from tungsten carbide.

5. Screw conveyor as claimed in claim 4, characterized in that each sealing device is urged axially with the aid of a helical compression spring disposed round the conveyor screw intermediate shaft.

6. Screw conveyor as claimed in claim 3, characterized in that there is an annular seal inside the bearing, between the sealing devices.

7. Screw conveyor as claimed in claim 1, characterized in that the bearing is a slide bearing.

8. Screw conveyor as claimed in claim 1, characterized in that the sealing elements are elastic in the axial direction of the shaft.

* * * * *